Patented June 16, 1953

2,642,516

UNITED STATES PATENT OFFICE 2,642,516

BINDER FOR FILLER MATERIALS IN TUBULAR WELDING RODS

Howard S. Avery, Mahwah, N. J., assignor to American Brake Shoe Company, New York, N. Y., a corporation of Delaware No Drawing. Application March 31, 1950, Serial No. 153,308

4 Claims. (Cl. 219—8)

This invention relates to welding rods and has reference more particularly to welding rods of the tubular type which essentially consist of a thin metal tube containing granular or powdered filler materials.

When a welding rod is fused by an electric arc or gas flame the tube and filler materials mingle in the molten pool, alloying takes place, and the deposit that finally solidifies has a new character different from that of either the tube or the filler. The weld deposit can be controlled in composition by tube and filler formulation. In addition it is customary to include materials in the filler to serve functions other than alloying. These include fluxing the surface welded upon, providing a shield for the arc during welding, protecting the molten pool, removing impurities by means of a slag cover, arc stabilization and the like.

Composite welding rods have also been made by means of a coating on a solid metal core. The ingredients that would be in the filler for a tubular rod are included in the coating formula. This is applied either by dipping the rods in a thick liquid suspension of the solid ingredients or by extruding the rod and the plastic coating through a die. For dipping or extrusion it is customary to use a binder that holds the coating together during fabrication stages and during storage and use of the rods. Soluble silicates, as typified by a colloidal solution or suspension of sodium silicate in water, are very common binders. The water content is adjusted to attain either a thick plastic mass like potter's clay for extrusion or thinner slurry for dipping. After coating, the rods are dried, usually by baking in an oven to remove excess moisture. In this stage the soluble silicate gives up water and becomes an effective solid cement. When welding takes place the silicate makes a further contribution to the slag and flux functions of the coating.

Tubular welding rods as heretofore manufactured have not generally contained a binder for the filler materials. On the contrary, reliance has been placed on a mechanical grip of the tube on the filler and on closing of the tube ends to prevent loss of the filler materials. It has further been proposed to corrugate or intermittently pinch the tubular rod after filling to minimize looseness of the enclosed powder. These practices are not entirely effective since handling or jarring the rods tends to compact, settle, or otherwise minimize the voids in the powder and as it then occupies less space than when initially filled and lightly compressed it regains its ability to run and spill from the open end of the tube during welding. Since the filler is almost necessarily a powder with present manufacturing equipment, a liquid binder like the soluble silicates, as typified by water glass, is not adaptable from the extrusion or dipping practice employed for coated rods.

A powder that can be converted to an effective binder after the tube has been filled and the ends closed would satisfactorily meet all requirements and eliminate the outstanding objections heretofore encountered in the use of tubular welding rods. Powdered organic compounds such as sugar have been employed as a binding compound. By heating the completed rod until the sugar caramelizes a binding effect is achieved, the sticky liquid later solidifying as the rod cools. This method is mechanically successful but chemically unsatisfactory since the smell of burning sugar during welding is undesirable and the decomposition of the sugar produces gases and water vapor which are detrimental to the qualities of the weld.

Accordingly, an object of the present invention is to provide a binder for tubular welding rods that can be added to the filler materials in granular or powdered form, which will subsequently liquify upon the application of heat to permeate the filler particles while molten and upon solidifying again on cooling will produce a substantially solid mass of the filler materials within the tubular rod and which will be chemically satisfactory as regards the decomposition products during welding.

A more specific object of the invention is to provide an inexpensive and readily available chemical compound for solidifying the granular filler materials in a tubular welding rod after the tube has been closed, a compound that can be added to the filler materials as a powder, and which will not evolve harmful or disagreeable fumes, gas or vapors during processing.

Another object of the invention resides in the provision of a tubular welding rod which will contain granular filler materials and a mineral or inorganic chemical compound providing a granular or powdered binder which will melt within a range of approximately 100 degrees to 900 degrees Fahrenheit and then solidify to bond the filler mass within the tube. As regards the chemical compounds contemplated by the invention, if the same should contain water as in the case of hydrous salts, the water should be reducible to satisfactory proportions during welding rod production by the application of heat within a practical range. Also the elements or oxides remaining from the melting of the composition during welding should not be detrimental to the weld metal or to the slag.

More specifically the invention contemplates an alkali metal silicate for use as a binder in the manufacture of tubular welding rods which will have a melting point low enough to permit fusion with the granular filler material of the rod at processing temperatures and which can be included mechanically as a free flowing powder with said granular filler materials.

The hydrous alkali silicates may be used as binders in tubular welding rod manufacture to achieve the desirable results heretofore enumerated. The compounds are added to the filler materials in powder form during manufacture and they become part of the filled and closed rod. In the tube forming equipment which is usually a continuous feed device, a small heating unit can be introduced into the tube line at a point after the tube is filled and closed. By adjusting the tube speed and the heat input at the heater, which may be a gas flame, the enclosed hydrous silicate is melted rapidly, thus wetting the other filler ingredients. At a point beyond the heater cooling takes place to solidify the molten binder, thus effectively anchoring the previously flowable powder into a solid mass. Sodium metasilicate pentahydrate is one of the hydrous alkali silicates that has been used successfully as a binder for the granular filler materials of a tubular welding rod. The pentahydrate has the following formula

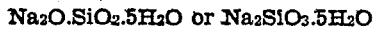

and contains about 29.2 per cent $Na_2O$, 28.3 per cent $SiO_2$ and 42.5 per cent $H_2O$.

The dehydrated salt, namely, $Na_2SiO_3$ has a melting point of about 1990 degrees Fahrenheit or about 1088 degrees centigrade. However, the presence of water of crystallization so lowers the melting points for some of the sodium metasilicate hydrates that for some of the sodium metasilicate hydrates they approach room temperature. Their melting is frequently described as dissolving in their water of crystallization. For the pentahydrate this occurs at about 162 degrees Fahrenheit or 71.8 degrees centigrade. Other sodium silicate hydrates melt at temperatures either above or below this point, as, for example:

$Na_2SiO_3.4H_2O$, melting point 85° centigrade
$Na_2SiO_3.6H_2O$, melting point 62.5° centigrade
$Na_2SiO_3.9H_2O$, melting point 47° centigrade In those cases where water vapor evolution during welding is not disadvantageous the tubular welding rods as described would be acceptable. However, since water vapor in contact with molten weld metal is desirably minimized, any fraction of the water in the hydrous silicates can be driven off by baking. Since the sodium metasilicate-water system forms a continuous series in either solid or liquid form the final $H_2O$ content and the melting point can be modified to any desirable point by controlling the time and temperature at which the rod is baked. As a practical matter about an hour at 500 degrees Fahrenheit gives satisfactory results.

After such baking, during stages of which the binder may be molten, the modified sodium metasilicate will be solid and therefore an effective binder, but will have its water content reduced to an acceptable level. During loss of water either during baking or welding there is a desirable freedom from unpleasant or noxious odors such as are developed when organic compounds are similarly heated.

Sodium metasilicate, while soluble in water, is not a good binder for dipped welding rod coatings, since certain colloidal behavior is lacking. Accordingly, sodium metasilicate and the water glass type sodium silicates are not interchangeable and this is an important feature of the present invention. When the said tubular welding rod is fused in the welding flame or arc, the soda and silica components of the binder will act in the same way as where they are provided by other sodium silicates. If lower soda-silica ratios are desired their effect may be attained by inclusion of silica powder in the welding rod filler formula. The uniform distribution and intimate mixing of the binder with the filler materials as contemplated by the technique described herein has produced certain desirable and practical advantages in the use of the welding rods such as better arc stability and better thermo and/or electrical conductivity in addition to those advantages resulting from the binding action of the chemical compound which prevents loss of the filler materials.

The procedure and chemical compounds herein described and explained may be considered the preferred embodiment of the invention although it is to be understood that the same is merely by way of illustration since I do not intend to be bound thereby but only by the scope of the following claims.

What is claimed is:

1. A tubular welding rod containing filler materials, said filler materials having mixed therewith an inorganic chemical compound selected from the sodium metasilicate hydrates to provide a binder for the filler materials, said filler materials and chemical compound being granular when initially inserted in the welding rod, and said chemical compound providing a binder since it melts during processing of the rod and congeals upon cooling to solidify the filler materials.

2. A tubular welding rod containing granular filler materials, said filler materials having mixed therewith sodium metasilicate pentahydrate to provide a binder for the filler materials, said filler materials and the sodium metasilicate pentahydrate being granular when initially inserted in the rod, and said sodium metasilicate pentahydrate providing a binder since it melts during processing of the rod and congeals upon cooling to solidify the filler materials.

3. In the production of a tubular welding rod, the steps which consist in filling said rod with filler materials in granular form, mixing with said granular filler materials as sodium metasilicate hydrate having a melting point low enough to permit fusion at welding rod processing temperatures and which can be included mechanically as a free-flowing powder in the granular filler materials, and subjecting said filled rod to heat during processing of the rod whereby to melt the sodium metasilicate hydrate and to thus solidify the filler materials within the rod when the sodium metasilicate hydrate congeals upon cooling of the rod.

4. In the production of a tubular welding rod, the steps which consist in filling said rod with filler materials in granular form, mixing with said granular filler materials sodium metasilicate pentahydrate having a melting point low enough to permit fusion at welding rod processing temperatures and which can be included mechanically as a free-flowing powder in the granular filler materials, and subjecting said filled rod to heat during processing of the rod whereby to melt said sodium metasilicate pentahydrate and to thus solidify the filler materials within the welding rod when the sodium metasilicate pentahydrate congeals upon cooling of the rod.

HOWARD S. AVERY.

References Cited in the file of this patent

UNITED STATES PATENTS

| Number | Name | Date |
|---|---|---|
| 1,650,905 | Mills | Mar. 29, 1927 |
| 1,704,978 | Knott | Mar. 12, 1929 |
| 1,936,799 | Mathias | Nov. 26, 1933 |
| 2,016,585 | Basore et al. | Oct. 8, 1935 |
| 2,052,400 | Mority | Aug. 25, 1936 |
| 2,219,462 | Wissler | Oct. 29, 1940 |
| 2,223,230 | Shepherd | Nov. 26, 1940 |
| 2,248,104 | Marini | July 8, 1941 |
| 2,350,387 | Cito | June 6, 1944 |
| 2,442,087 | Kennedy | May 25, 1948 |
| 2,471,803 | Wasserman | May 31, 1949 |
| 2,474,787 | Landis | June 28, 1949 |

FOREIGN PATENTS

| Number | Country | Date |
|---|---|---|
| 513,045 | Great Britain | Dec. 20, 1937 |